3,309,239
METAL PASTES FOR USE IN BRAZING
Edward Percival Harris, Mannings Heath, Horsham, England, assignor to Edwards High Vacuum International Limited, Crawley, England, a British Company
No Drawing. Filed Jan. 27, 1964, Ser. No. 340,500
Claims priority, application Great Britain, Feb. 5, 1963, 4,693/63
5 Claims. (Cl. 148—24)

This invention relates to metal pastes for use in brazing operations.

In the joining of metals by brazing, the metal or alloy used as the joining medium is commonly applied in the form of a fine powder which melts under the influence of heat and flows into the joint by capillary action. In order to ensure that the powder remains in position in the joint area, it is usual in most cases to mix it with a binder so as to form a paste which will adhere to the metal surfaces.

The type of binder commonly used for this purpose is a quick-setting adhesive such, for example, as an acrylic cement, and the paste is prepared in the desired quantity immediately before application. There are several disadvantages inherent in using binders of this kind. The quick-setting property makes it undesirable to prepare a bulk supply of paste in advance of the brazing operation, any paste not used at once will set hard and will be wasted and it is difficult, if not impossible, to control with any accuracy the composition of small quantities of paste containing a quick-setting constituent. Such a binder will decompose with the application of heat, one product of decomposition being carbon which, if present in excess, may not be completely eliminated, and may enter the joint with the molten alloy causing porosity. Excess carbon may also react deleteriously with the metals in the joint area.

The object of the present invention is to provide a paste which avoids the disadvantages of the known pastes and according to the invention, a paste for use in a brazing operation comprises a mixture including a metal powder, a binding medium constituted by ethyl hydroxyethyl cellulose, a small amount of an adhesive material which serves to increase the adhesion of the paste to the surface to be brazed, a plasticiser and a preservative, the metal powder and binding medium being mixed together in proportions suitable for imparting the desired metal content and consistency to the paste.

The viscosities of the water solutions of the binding medium used in carrying out the invention can be controlled so that stable paste suspensions containing more than 80% of metal powder may be prepared and kept in stock for long periods without deterioration or settlement of the powder content. A suitable surface-active agent may be added, if necessary, to improve the wetting property of the paste on surfaces which may have been imperfectly cleaned. Compounds used with success in this way include that known under the trade name of "Teepol." A small quantity of a plasticiser, e.g. glycerine, ethylene glycol or polyethylene glycol is used in order to ensure that the paste film formed on the metal surface retains a degree of flexibility as the paste dries out.

One paste mixture composed in accordance with the invention will now be described in greater detail by way of example.

A binding medium is prepared by dissolving in water the requisite amount of ethyl hydroxyethyl cellulose which is a water soluble cellulose gum known under the trade name "Modocoll EK 600," together with small quantities of dextrin and ethylene glycol, the latter serving in this example as a plasticiser. To this binding medium is added the correct amount of brazing metal in fine powder form, and the mixture is stirred to produce a paste of uniform consistency.

In order to prevent attack by micro-organisms, it has been found necessary to include a preservative in the composition of the paste. A preferred preservative is benzetonium chloride a very small quantity of which is incorporated in the binder in the form of a 10% solution. Other preservatives may, of course, be used and the quantity used need be so small that there would be no material effect on the carbon content.

The constituents of the paste are present in the following proportions, which are expressed in approximate terms of percentage by weight:

| | Percent |
|---|---|
| Brazing Metal Powder | 86.0 |
| "Modocoll" EK 600 | 0.5 |
| Dextrin | 0.4 |
| Ethylene glycol | 0.3 |
| Preservative (10% solution) | 0.2 |
| Water | 12.6 |

Metal powder paste mixtures made in accordance with the invention may be prepared in any desired quantity, and under close analytical control, so that the carbon content may be kept within tolerable limits. Prolonged exposure to air may cause some drying-out of the paste, but the consistency and flexibility of the paste may be restored by the gradual addition of small quantities of water accompanied by thorough stirring. Furthermore, it is possible to recover the metal or alloy powder from unused or unwanted paste, even if it has been allowed to dry out, by elutriation with water or other suitable solvent.

Another feature of this paste composition is the ease with which it may be extruded through a small orifice, making it particularly suitable for application from a collapsible tube or with a syringe. Also, the suspension may be modified, if desired, to a consistency suitable for application with a paint brush or spray gun to cover large areas requiring a superficial metal coating finishd.

I claim:
1. A brazing paste consisting of a mixture containing about 86 percentage parts by weight of a metal powder and about 14 percentage parts by weight of a binding medium, said binding medium consisting essentially of about 0.5 percentage parts by weight of ethyl hydroxyethyl cellulose, about 0.3 percentage parts by weight of a plasticiser, about 0.2 percentage parts by weight of a preservative, about 0.4 percentage parts of an adhesive material adapted to increase the adhesion of the paste to the surfaces to be brazed, and the balance of about 12.6 percentage parts by weight of water, all weights being based on the total weight of the mixture.

2. A brazing paste according to claim 1 in which the preserpative is benzetonium chloride.

3. A brazing paste according to claim 1 in which the adhesive material is dextrin.

4. A brazing paste according to claim 1 in which said aqueous solution includes a wetting agent in its composition.

5. A brazing paste according to claim 1 in which the plasticiser is a member selected from the group consisting of glycerine, ethylene glycol, and polyethylene glycol.

References Cited by the Examiner
UNITED STATES PATENTS

| 3,073,270 | 1/1963 | Johnson et al. | 148—24 |
| 3,149,007 | 9/1964 | Chamer | 148—24 |

DAVID L. RECK, *Primary Examiner.*
H. F. SAITO, *Assistant Examiner.*